Aug. 6, 1957 R. F. BENNING ET AL 2,801,900
PROCESS FOR TREATING SPENT SULFITE LIQUOR
Filed July 16, 1954
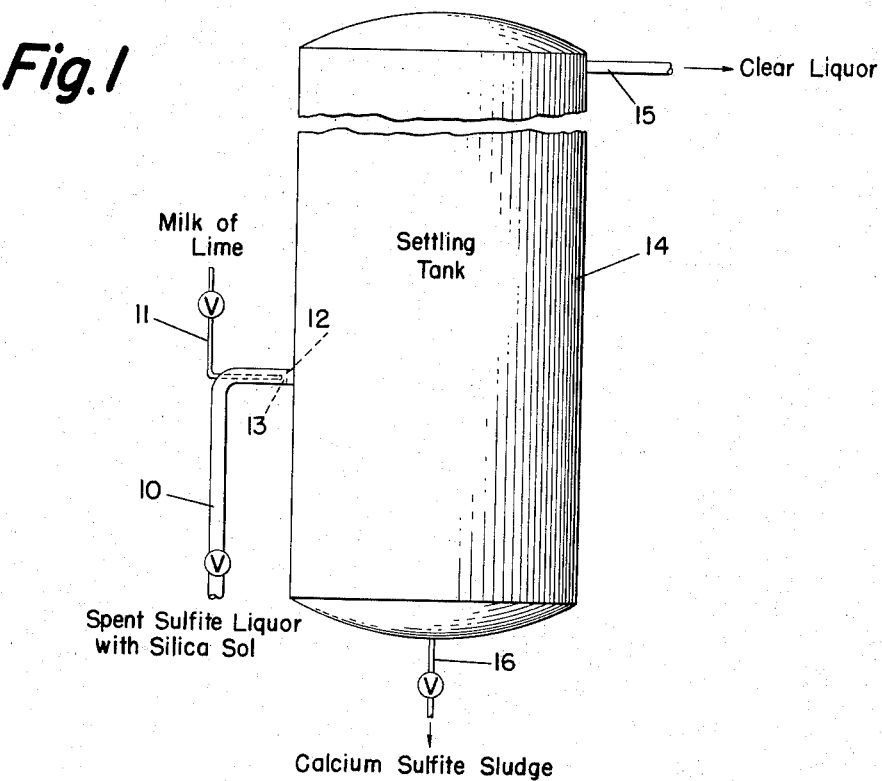
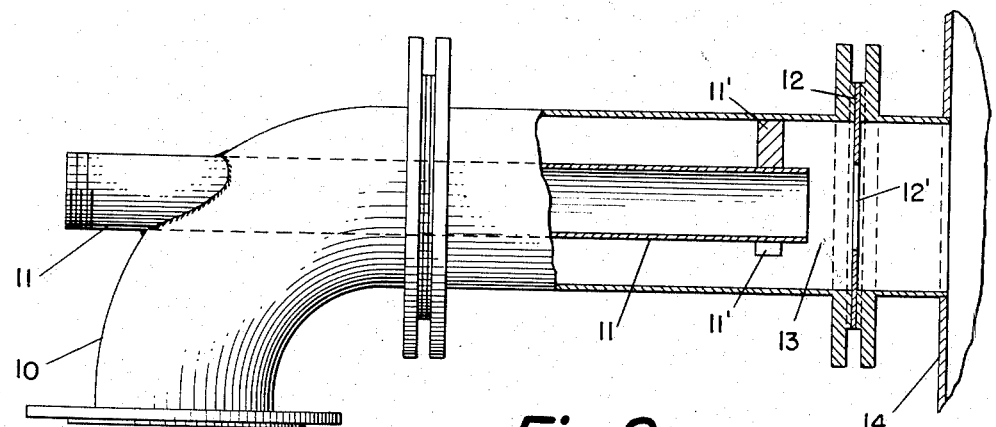
INVENTORS.
RICHARD F. BENNING
MARTIN A. BAUM
BY
Joseph Rossman
ATTORNEY

United States Patent Office 2,801,900
Patented Aug. 6, 1957

2,801,900

PROCESS FOR TREATING SPENT SULFITE LIQUOR

Richard F. Benning, Wausau, and Martin A. Baum, Rothschild, Wis., assignors to Marathon Corporation, Rothschild, Wis., a corporation of Wisconsin Application July 16, 1954, Serial No. 443,836

2 Claims. (Cl. 23—131)

This invention relates to a process for treating spent sulfite liquor obtained in wood pulp manufacture. More specifically, the invention relates to the treatment of spent sulfite liquor for rapidly and continuously removing calcium bisulfite and loosely combined sulfur dioxide therefrom.

Spent sulfite liquor, a by-product obtained in wood pulp manufacture, contains calcium lignosulfonate, carbohydrates, volatile organic acids, calcium bisulfite and loosely combined sulfur dioxide. Utilization of spent sulfite liquor by fermentation of carbohydrates for yeast or alcohol production, or by precipitation of lignosulfonates, requires that residual calcium bisulfite and loosely combined sulfur dioxide, which is split off from organic matter by neutralization to a pH of 8 with alkali, should be removed. This can be accomplished by air or steam stripping or by precipitation with lime and removal as insoluble calcium sulfite as disclosed in Reissue Patent 18,268, December 1, 1931.

Crystal formation of calcium sulfite in spent sulfite liquor treated with lime is dependent on temperature and pH. A temperature of 65 to 75° C. and a pH of 9.5 to 10.5 is preferred. At temperatures less than 65° C., the crystals formed are too small to be readily removed either by filtering or settling. A pH range of 9.5 to 10.5 is preferred since within this range a portion of the lignosulfonate is precipitated as a basic calcium salt. This salt occludes the calcium sulfite and thus acts as a coagulant aid. When the pH is above 10.5, the proportion of precipitated basic calcium lignosulfonate is increased greatly, thus reducing the purity of the calcium sulfite fraction. When the pH is less than 9.5, the amount of precipitated basic calcium lignosulfonate is too slight to aid coagulation; the calcium sulfite then remains finely dispersed. When the reaction is operated within the preferred range, six to eight hours settling time in a continuous system is required to separate the calcium sulfite sludge. This sludge then contains about 40 percent calcium sulfite on solids basis.

According to the present invention the time required to settle the calcium sulfite is reduced to two or less minutes by the addition of flocculating agents to a static system or about 20 minutes in a continuous system. The use of sodium silicate sol, hereinafter designated as silica sol, has been found to be particularly effective. Further details and advantages of the invention will be apparent from the following description of the process.

Sodium silicate sol is prepared by any of the known procedures, such as by reacting sodium silicate with sulfuric acid, ammonium sulfate, sodium bicarbonate or other reagents.

Silica sol is preferably prepared by a partial neutralization of the sodium oxide in sodium silicate. Activation (micelle growth) occurs through release of silica from the sodium silicate. The degree of activation varies and is controlled by the starting dilution of the silicate, by detention or aging time, by ratio of activant to silicate and by reaction temperature. Colloidal condition of the silica sol is stabilized by secondary dilution with water.

In our preparation, sodium silicate (N brand sold by Philadelphia Quartz Co.) is diluted with water to a concentration of 1.5% by weight silica. This is reacted with an amount of sulfuric acid equivalent to 90% by weight of the sodium oxide in the sodium silicate. The amount of acid added is controlled so that 10 ml. of the silica sol will consume between 10 and 12 ml. N/50 acid when titrated to a methyl purple end point. The reaction is as follows:

$$Na_2OSiO_2 + H_2SO_4 \rightarrow Na_2SO_4 + SiO_2 + H_2O$$

The reaction mixture is allowed to stand one hour at room temperature. Micelle formation is then stopped by diluting the reaction mixture with water to a silica concentration of 1.0% by weight.

Other methods of forming activated silica sols may also be used such as the use of ammonium sulfate in accordance with U. S. Patent 2,444,774 and the use of alum in accordance with U. S. Patent 2,310,009.

In accordance with our invention, spent sulfite liquor is treated with 30 to 50 p. p. m. silica sol and is then neutralized with lime to pH of 8.4 to 9.0. A coagulated calcium sulfite forms which settles in one to two minutes. The time for settling of calcium sulfite is dependent on the concentration of silica sol and on the reaction pH. The time to flocculate and settle is not further reduced by using more than 50 p. p. m. silica sol. The pH is maintained in the range of 8.4 to 9.0. Floc forms as low as 6.5 pH but a pH minimum of 8.4 is required to split off loosely combined sulfur dioxide and convert it to calcium sulfite. At a pH above 9.0, basic calcium lignosulfonate is precipitated in amounts which will interfere with rapid floc formulation. The order in which silica sol and lime are added is important. The preferred procedure is to first add silica sol to the spent sulfite liquor which is then followed by the addition of lime. A flocculated calcium sulfite will result, but of inferior quality when silica sol is added to lime reagent and the mixture then added to spent sulfite liquor. The quality of floc is very poor when silica sol is added after lime has been added to the spent sulfite liquor.

The floc obtained with silica sol is friable, that is, it will break and redisperse with mechanical agitation and will then not settle rapidly. This difficulty of floc breaking is eliminated in our process by utilizing a novel apparatus as will be hereinafter described. Silica treated spent sulfite liquor and lime are mixed in a mixing zone at a rate up to 300 gallons liquor per minute where the floc is formed and from which zone it is rapidly removed without mechanical agitation. The reaction mixture carrying the floc then passes into a settling vessel where settling occurs. Clear liquor is removed continuously from the top of the settling vessel and calcium sulfite sludge from the bottom.

A suitable apparatus for carrying out our process is illustrated in the accompanying drawings, wherein:

Figure 1 is a diagrammatic vertical view of the apparatus, and

Figure 2 is an enlarged elevational view of the apparatus at the mixing zone.

In carrying out our process utilizing the apparatus shown in Figures 1 and 2, continuous streams of milk of lime and the spent sulfite liquor containing the added silica sol are continuously fed to a mixing-reacting zone 13. The spent sulfite liquor containing the added silica sol, in amounts as previously explained, is fed to a supply line 10 which is provided with an orifice plate 12 adjacent its outlet to the settling tank 14. The plate 12 is provided with an orifice 12'. A conduit 11 for supplying a continuous stream of milk of lime extends within the supply line 10 and terminates short of the orifice plate 12 as shown in Figure 2 so as to provide a mixing zone 13. The end of the conduit 11 is supported by spaced lugs 11'. The orifice plate 12 is located adjacent the inlet to the tank 14 as shown in Figure 2 to mix the streams from conduits 10 and 11 in the mixing zone, designated by numeral 13, where the two streams are mixed prior to flowing into tank 14 through the orifice 12'. The stream of milk of lime and stream of spent sulfite liquor containing the added silica sol are completely mixed in the mixing zone 13 and also during passage through the orifice 12'. The reaction mixture continues to flow into the settling tank 14 without detrimental mechanical agitation of the calcium sulfite floc which is formed as the reaction mixture enters settling tank 14. Formation of floc with our apparatus prevents the break-up of the floc formed and settling is accomplished in one operation. A further advantage of our invention is that the calcium sulfite as formed by our process and when separated as a concentrated sludge can be filtered and washed to remove all mother liquor.

It is to be understood that variations and changes in the specific details of our invention may be made which are intended to be included within the scope of the appended claims.

We claim:

1. The method of treating spent sulfite liquor which comprises the steps of adding 30 to 50 p. p. m. silica sol to said liquor, then adding lime to neutralize the liquor to a pH range from 8.4 to 9.0, whereby a calcium sulfite sludge is formed and rapidly settled out.

2. The method of treating spent sulfite liquor which comprises the steps of continuously feeding a stream of spent sulfite liquor containing added silica sol in amounts from about 30 to 50 p. p. m. to a mixing zone, continuously feeding a stream of milk of lime to said mixing zone wherein the said streams are mixed and the spent sulfite liquor is neutralized to a pH range of 8.4 to 9.0 to form calcium sulfite floc, continuously feeding the resulting mixture containing substantially unbroken calcium sulfite floc therein to a settling zone, settling the precipitated calcium sulfite floc, removing the said floc from said settling zone and removing the clear supernatant liquor from said settling zone.

References Cited in the file of this patent

UNITED STATES PATENTS

| | | |
|---|---|---|
| 1,685,800 | Baker | Oct. 2, 1928 |
| 1,908,862 | Reese | May 16, 1933 |
| 2,014,374 | Brill | Sept. 17, 1935 |

OTHER REFERENCES

Farnell: "Precipitation of Calcium Sulphite . . . Sugar Manufacture," International Sugar Journal (1926), vol. 28, pages 36–45.

Concise Chemical and Technical Dictionary, H. Bennett, page 426, Chemical Publishing Co., 1947.